(12) United States Patent
Bolea et al.

(10) Patent No.: US 12,275,029 B2
(45) Date of Patent: Apr. 15, 2025

(54) FLUID DELIVERY SYSTEM

(71) Applicants: Phillip Bolea, Grant, MN (US); Eric Donaldson, Saint Paul, MN (US); Christopher Anton, Rosemount, MN (US)

(72) Inventors: Phillip Bolea, Grant, MN (US); Eric Donaldson, Saint Paul, MN (US); Christopher Anton, Rosemount, MN (US)

(*) Notice: Subject to any disclaimer, the term of this patent is extended or adjusted under 35 U.S.C. 154(b) by 0 days.

(21) Appl. No.: 18/680,532

(22) Filed: May 31, 2024

(65) Prior Publication Data

US 2024/0316585 A1  Sep. 26, 2024

Related U.S. Application Data

(63) Continuation of application No. 18/216,845, filed on Jun. 30, 2023, now Pat. No. 12,030,074, which is a
(Continued)

(51) Int. Cl.
*B05B 12/14* (2006.01)
*B05B 7/00* (2006.01)
(Continued)

(52) U.S. Cl.
CPC ........ *B05B 12/1418* (2013.01); *B05B 7/2497* (2013.01); *B05B 12/1436* (2013.01); *B05B 12/1445* (2013.01); *F04B 13/02* (2013.01); *F04B 23/02* (2013.01); *F04B 23/04* (2013.01); *F04B 49/065* (2013.01); *F16L 11/085* (2013.01); *F16L 11/127* (2013.01); *B05B 7/0018* (2013.01); *B05B 7/0408* (2013.01); (Continued)

(58) Field of Classification Search
CPC ........ F16L 11/085; F16L 11/127; F16L 25/01; F16L 2201/60; B05B 7/1693; B05B 7/0018; B05B 7/0408; B05B 7/2497; B05B 7/2491; B05B 12/1418; B05B 12/1436; B05B 12/1445; H01B 7/04; H01B 7/282; H01B 13/0036; H01B 13/2606; H01R 13/005; H01R 4/183; H01R 4/72; H01R 9/0518; H01R 24/38; F04B 13/02; F04B 23/02; F04B 23/04; F04B 49/065; G05B 2219/45013
See application file for complete search history.

(56) References Cited

U.S. PATENT DOCUMENTS

511,188 A * 12/1893 Barnard .................. F16L 25/01
  340/320
3,140,884 A * 7/1964 Brauck .................... F16L 33/22
  285/259
(Continued)

*Primary Examiner* — William M McCalister
(74) *Attorney, Agent, or Firm* — Peter J. Beardsley; Omnus Law (57) ABSTRACT

A fluid delivery system includes a conduit. The conduit is configured to deliver a fluid. The conduit further includes a first electrically conductive element configured to deliver electricity through a length of the conduit. The fluid delivery system further includes master hub disposed on a fluid delivery device. The fluid delivery system also includes at least one slave hub disposed on the conduit and communicatively coupled to the master hub.

12 Claims, 12 Drawing Sheets

Related U.S. Application Data continuation of application No. 16/043,088, filed on Jul. 23, 2018, now Pat. No. 11,731,153.

(60) Provisional application No. 62/535,130, filed on Jul. 20, 2017.

(51) Int. Cl.

| | | |
|---|---|---|
| *B05B 7/04* | (2006.01) | |
| *B05B 7/16* | (2006.01) | |
| *B05B 7/24* | (2006.01) | |
| *F04B 13/02* | (2006.01) | |
| *F04B 23/02* | (2006.01) | |
| *F04B 23/04* | (2006.01) | |
| *F04B 49/06* | (2006.01) | |
| *F16L 11/08* | (2006.01) | |
| *F16L 11/127* | (2006.01) | |
| *F16L 25/01* | (2006.01) | |

(52) U.S. Cl.
CPC .......... *B05B 7/1693* (2013.01); *B05B 7/2491* (2013.01); *F16L 25/01* (2013.01); *F16L 2201/60* (2013.01); *G05B 2219/45013* (2013.01)

(56) References Cited

U.S. PATENT DOCUMENTS

| | | | | |
|---|---|---|---|---|
| 3,749,814 A * | 7/1973 | Pratt | ..................... | F16L 11/127 285/256 |
| 3,963,856 A * | 6/1976 | Carlson | ................ | F16L 11/1185 252/511 |
| 4,009,733 A * | 3/1977 | Schnabel | ................ | F16L 11/12 138/109 |
| 4,901,975 A * | 2/1990 | Gill | .......................... | B05B 9/08 439/191 |
| 5,022,864 A * | 6/1991 | Ali | ............................ | B05B 9/08 439/192 |
| 5,222,770 A * | 6/1993 | Helevirta | ............... | F16L 25/023 439/191 |
| 6,734,805 B2 * | 5/2004 | Johnson | .................. | E21B 17/01 340/854.3 |
| 6,915,965 B2 * | 7/2005 | Siebert | .................... | A62C 33/00 239/289 |
| 7,018,221 B2 * | 3/2006 | Daume | .................. | H01R 4/643 439/100 |
| 8,399,767 B2 * | 3/2013 | Duquette | .................. | H05F 3/00 29/829 |
| 8,590,365 B2 * | 11/2013 | Weppenaar | ........... | G01M 3/047 73/24.02 |
| 8,944,471 B2 * | 2/2015 | Rodenburg | ............. | F16L 33/01 285/222.1 |
| 9,167,228 B2 * | 10/2015 | Monari | ................ | H04N 23/661 |
| 11,022,987 B2 * | 6/2021 | Donaldson | ............ | B29B 7/7404 |
| 11,204,112 B2 * | 12/2021 | Bolea | ................ | H01B 13/0036 |
| 2001/0032892 A1 * | 10/2001 | Brooks | .................. | F16L 11/127 138/116 |
| 2005/0279865 A1 * | 12/2005 | Thomason | ................ | B05B 7/16 239/525 |
| 2006/0080050 A1 * | 4/2006 | Zimmermann | ......... | G01F 1/698 702/53 |
| 2006/0265151 A1 * | 11/2006 | DuHack | .................. | G01F 1/698 702/53 |
| 2006/0289561 A1 * | 12/2006 | Bourget | .................... | H05B 3/58 222/54 |
| 2009/0071665 A1 * | 3/2009 | Shoap | ..................... | F16L 11/12 174/15.6 |
| 2016/0018827 A1 * | 1/2016 | Yokota | ..................... | G05D 7/03 374/4 |
| 2016/0199559 A1 * | 7/2016 | Glaser | ................. | A61M 1/3624 210/321.71 |
| 2017/0332884 A1 * | 11/2017 | Amling | ................... | H02J 50/10 |

\* cited by examiner

FLUID DELIVERY SYSTEM

CROSS REFERENCE TO RELATED APPLICATIONS

This application is a continuation of U.S. Ser. No. 18/216,845, filed 30 Jun. 2023, which application was a continuation of U.S. Ser. No. 16/043,088, filed 23 Jul. 2018, which claims priority from and the benefit of U.S. Provisional Application Ser. No. 62/535,130, entitled "SYSTEMS AND METHODS FOR COMMUNICATION AND CONTROL IN FLUID DELIVERY SYSTEMS," filed Jul. 24, 2017, which is hereby incorporated by reference in its entirety for all purposes.

Some fluid delivery systems, such as Spray Polyurethane Foam (SPF) systems are used for applying foam insulation to residential or commercial structures. These systems deliver two or more materials through hoses from a stationary pumping system (e.g., proportioner system) to a spray foam gun used to apply the material to a structure. The proportioner system may be located at a distance from the actual foam application work area and spray foam gun. It would be useful to improve communications and control for SPF systems.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below In a first embodiment, a fluid delivery system includes a smart hose. The smart hose includes a fluid conduit configured to deliver a fluid. The smart hose further includes a first electrically conductive element configured to deliver electricity through a length of the smart hose. The fluid delivery system further includes master hub disposed on a fluid delivery device. The fluid delivery system also includes at least one slave hub disposed on the smart hose and communicatively coupled to the master hub.

In a second embodiment, method of communicating via a fluid delivery system includes sending data via a master hub disposed on a fluid delivery device. The method further includes receiving the data via a slave hub disposed on a smart hose, wherein the smart hose comprises a fluid conduit configured to deliver a fluid; and a first electrically conductive element configured to deliver electricity through a length of the smart hose.

In a third embodiment, a fluid delivery system includes a proportioner system configured to control a pressure, a temperature, a flow, or a combination thereof, of a first fluid and of a second fluid. The fluid delivery system additionally includes at least one smart hose configured to deliver the first or the second fluid to a spray gun, wherein the smart hose comprises a hollow conduit configured to deliver the first or the second fluid and a First conductive layer configured to deliver electricity through a length of the smart hose. The fluid delivery system also includes a master hub disposed on the proportioner system. The fluid delivery system further includes at least one slave hub disposed on the smart hose and communicatively coupled to the master hub.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In systems that transmit liquids or gases from a source location to a delivery location (or locations), electronic communication between the source and delivery locations may be important for process control, information presentation, distributed control, and so on. One example of systems that may benefit from improved communications and control are Polyurethane Foam (SPF) insulation systems. The SPF systems use a pressurized hose assembly to transmit two or more fluids between a proportioning system and a spray gun that is near a foam target, such as a wall. The proportioning system is may include fluid pumps and heaters, supply drums, control system, user interface, sensors, and associated electronics. The proportioning system may be located in a truck or trailer outside of a building that foam insulation is being applied to. The fluids used to provide the insulation may be mixed at high pressure and ejected from the spray gun to initiate the chemical reaction that that results in cured foam.

In many SPF systems, control parameters and status indicators are located at or on the proportioning system, which can be several hundred feet away from where the spray foam applicator (i.e., person applying the spray foam) is working. The spray foam applicator may have special skills that improve the success of the operation, however this person may lacks access to real-time critical system information that affects behavior of the spray foam process because the information is usually kept a distance away in the proportioning system. Problems with the spray foam system may result in poor foam quality, lower yield, and so on. It may not be efficient for the spray foam applicator to return to the proportioning system to discover status or diagnostic information about the spray foam application system, or to make changes to the proportioning system that may be used to correct issues he/she observes in the foam insulation. Further, the spray gun operator usually wears Personal Protective Equipment (PPE) that may burden his/her ability to return to the proportioning system to adjust settings and/or determine status of the equipment and material supplies.

The techniques described herein include novel solutions to the issues outlined above, and presents new unanticipated capabilities for fluid delivery systems, and in particular, to SPF systems. Other examples include paint spray systems, industrial/chemical mixing and processing, systems, and fuel and hydraulic delivery systems. Any process that uses a hose or other conduit to transport fluids from one location to another may benefit from the techniques described herein in certain embodiments, electrically conductive elements are integral to, or in association with the fluid or gas conduits (e.g. hose or pipe), may act as electrical power and signal carrying members between a master communication hub and two or more remote slave hubs that are located along, or at the distal end, of the fluid/gas conduits.

The slave hub(s) contain electronic components that may be powered by the conductive elements within or between fluid/gas conduits. A function of these slave hubs is to transmit digital data signals over the same conductors that power the electronics in the slave hubs. This communication can be simplex, half duplex, duplex, or a combination thereof. The master/slave techniques allow the power sending elements (conductors) to also act as a communication channel, which eliminates the need for extra cables/conductors. This approach is referred to as "Power Line Communication" (PLC). The use of PLC in combination with conductive fluid or gas conduits presents an extension of the technology, in that the conduit (or conduits) themselves become the electrically conductive member(s) used to implement PLC without additional power or signal cables.

The slave hub(s) may have integrated or attached electronics to provide local sensing and communication capabilities in the vicinity of the slave hub(s). This information can be processed by electronics within the hub, displayed to users in the vicinity of the hub, or communicated between the slave and master hub to control or communicate parameters of other systems.

It may be useful to describe a system that may apply the slave/hub PLC techniques that may be combined with fluid delivery and the electrical deliver hoses as described herein. Accordingly and turning now to FIG. 1, the figure is a block diagram illustrating an embodiment of a spray application system 10 (e.g., Spray Polyurethane Foam (SPF) system) that may include one or more liquid pumps 12, 14. The spray application system 10 may be suitable for mixing and dispensing a variety of chemicals, such as a chemicals used in applying spray foam insulation. In the depicted embodiment, chemical compounds A and B may be stored in tanks 16 and 18, respectively. The tanks 16 and 18 may be fluidly coupled to the pumps 12 and 14 via conduits or hoses 20 and 22. It is to be understood that while the depicted embodiment for the spray application system 10 shows two compounds used for mixing and spraying, other embodiments may use a single compound or 3, 4, 5, 6, 7, 8 or more compounds. The pumps 12 and 14 may be independently controlled.

Figure 1:
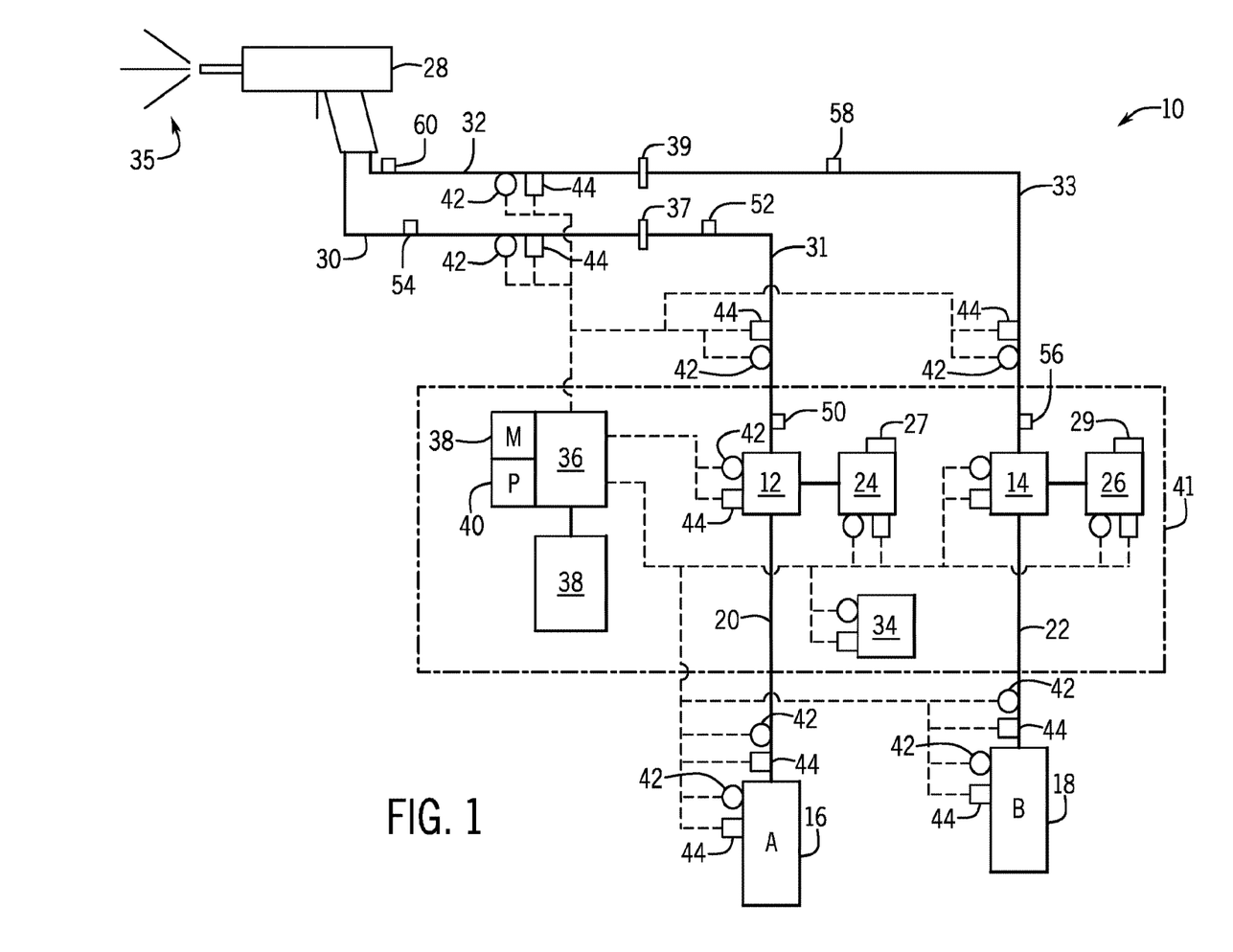
FIG. 1 is block diagram of an embodiment of a spray application system, such as a multi component fluid delivery system (e.g., SPF system)

During operations of the spray application system 10, the pumps 12, 14 may be mechanically powered by motors 24, 26, respectively. In a preferred embodiment, the motors may be electric motors. However, internal combustion engines (e.g., diesel engines), pneumatic motors, or a combination thereof. Motor controllers 27 and 29 may be used to provide for motor start/stop, loading, and control based on signals transmitted, for example, from the processor 40.

The motor 24 may be of the same type or of a different type from the motor 26. Likewise, the pump 12 may be of the same type or of different type from the pump 14. Indeed, the techniques described herein may be used with multiple pumps 12, 14, and multiple motors 24, 26, which may be of different types.

The pumps 12, 14 provide for hydrodynamic forces suitable for moving the compounds A. B into a spray gun system 28. More specifically, compound A may traverse the pump 12 through conduit 20 and then through heated conduits 31, 30 into the spray gun system 28. Likewise, compound B may traverse pump 14 through conduit 22 and then through heated conduits 33, 32 into the spray gun system 28. To heat the heated conduits 20, 22, 30, 31, 32, 33, a heating system 34 may be provided. The heating system 34 may provide for thermal energy, such as a heated fluid, suitable for pre-heating the compounds A and B before mixing and spraying and for heating the compounds A and B during mixing and spraying. The conduit 31 may be connected to the conduit 30 via a hose fitting 37. The conduit 33 may be connected to the conduit 32 via a hose fitting 39.

The spray gun system 28 may include a mixing chamber to mix the compounds A and B. For spray foam insulation applications, the compound A may include isocyanates while the compound B may include polyols, flame retardants, blowing agents, amine or metal catalysts, surfactants, and other chemicals. When mixed, an exothermic chemical reaction occurs and a foam 35 is sprayed onto a target. The foam then provides for insulative properties at various thermal resistance (i.e., R-values) based on the chemicals found in the compounds A and B.

Control for the spray application system 10 may be provided by a control system 36. The control system 36 may include an industrial controller, and thus include a memory 38 and a processor 40. The processor 40 may include multiple microprocessors, one or more "general-purpose" microprocessors, one or more special-purpose microprocessors, one or more application specific integrated circuits (ASICS), and/or one or more reduced instruction set (RISC) processors, or some combination thereof. The memory 38 may include a volatile memory, such as random access memory (RAM), and/or a nonvolatile memory, such as ROM, a hard drive, a memory card, a memory stick (e.g., USB stick) and so on. The memory 38 may include computer programs or instructions executable by the processor 40 and suitable for controlling the spray application system 10. The memory 38 may further include computer programs or instructions executable by the processor 40 and suitable for detecting pump 12, 14 slip and for providing ratio control actions to continue providing as desired ratio (e.g., 1.1) for compounds A and B in the presence of slip, as further described below.

The control system 36 may be communicatively coupled to one or more sensors 42 and operatively coupled to one or more actuators 44. The sensors 42 may include pressure sensors, flow sensors, temperature sensors, chemical composition sensors, speed (e.g., rotary speed, linear speed) sensors, electric measurement sensors (e.g., voltage, amperage, resistance, capacitance, inductance), level (e.g., fluid level) sensors, limit switches, and so on. The actuators 44 may include valves, actuatable switches (e.g., solenoids), positioners, heating elements, and so on.

A user or users may interface with the control system 36 via an input/output (I/O) system 38, which may include touchscreens, displays, keyboards, mice, augmented reality/virtual reality systems, as well as tablets, smartphones, notebooks, and so on. A user may input desired pressures, flow rates, temperatures, ratio between compound A and compound B (e.g., 1.1), alarm thresholds (e.g., threshold fluid levels of compound A, B in tanks 16, 18), and so on. The user may then spray via the spray gun system 28 and the control system 36 may use the processor 40 to execute one or more programs stored in the memory 38 suitable for sensing system 10 conditions via the sensors 42 and for adjusting various parameters of the system 10 via the actuators 44 based on the user inputs. The I/O system 38 may then display several of the sensed conditions as well as the adjusted parameters. Certain components of the spray application system 10 may be included in or interface with a proportioner system 41. The proportioner system 41 may "proportion" or deliver the compounds A, B at a specified ratio (e.g., 1:1) to achieve the spray 35. In this manner, the user(s) may mix and spray chemicals, such as compounds A and B, to provide for certain coatings, such as insulative spray foam.

The proportioner system 41 controls pressure, flow, and temperature of the fluids based on setting provided by the user. The proportioner system 41 is generally located at a distance from the actual foam application work area and spray foam gun 28. In most of these systems, temperature and/or pressure sensing of one or more of the fluids near the spray gun 38 is required to provide proper fluid mixing of the materials at the spray gun In most of these systems, control parameters and status indicators are all located at the proportioning system 38, which can be several hundred feet away from where the spray foam applicator is working. The spray foam applicator has special skills that determine the success of the operation, however this person does not have access to real-time and sometimes critical system information that affect the quality of the spray foam 35 process. It is not efficient for the spray foam applicator to return to the proportioner system 41 to discover status or diagnostic information about the spray foam application system 10. The spray gun operator wears Personal Protective Equipment (PPE) that further burdens his/her ability to return to the proportioner system 41 to adjust settings and/or determine status of the equipment and material supplies. The pressurized hoses 20, 22, 30, 31, 32 and/or 33 operate in a harsh environment and are subject to abuse typical of construction sites.

To date, most systems 10 that employ remote sensing and/or control capabilities do so with dedicated wired cables (i.e. a "tethered" system). The use of wireless communication with remote power sources is also an approach to providing electrical sensing, communication, and control signals between portions of a hydraulic system. Both of these approaches may have problems with reliability. In the case of the tethered approach, extra wire bundles and connectors are points of potential failure In the case of a wireless approach, building materials and the RF environment in the work area may prevent reliable signal transmission. Also, in a wireless approach, any power required in the work area must be provided via storage devices (e.g. batteries) or by a local power source. This may add complexity and additional points of potential failure to the system.

The techniques described herein include novel solutions to the issues outlined above, and present new unanticipated capabilities for fluid delivery systems, and in particular, to SPF systems such as system 10. Other examples include paint spray systems, industrial/chemical mixing and processing, systems, and fuel and hydraulic delivery systems. Any process or system that uses a hose to transport fluids from one location to another and where electronic communication of information is desired, are candidates for the techniques described herein.

The flexible hoses 20, 22, 30, 31, 32 and/or 33 may not only provide for the delivery of fluids, but also for the delivery of electricity (e.g., electrical signals, electrical power). Likewise, the hose fittings 37, 39 may not only connect the hoses 30, 31, and 32, 33 to each other, but also deliver the electricity between the hoses 30 and 31 and the hoses 32 and 33. To deliver electricity, the hoses 20, 22, 30, 31, 32 and/or 33 may include conductive elements, as described below. The fittings 37, 39 may be made of metal and/or include crimping connections to the conductive elements of the hoses, also as further described below.

The hoses 20, 22, 30, 31, 32 and/or 33 may be used to communicatively couple master hub(s) to slave hub(s). For example, master hub 50 may be communicatively coupled to slave hubs 52, 54. Likewise, master hub 56 may be communicatively coupled to slave hubs 58, 60. The master hubs 50, 56 may provide any information available in the proportioning system 41, including temperatures, pressures, flow rates, types of compounds A and B. and so on.

The slave hubs, 52, 54, 58, 60 may collect, process, and communicate certain parameters (e.g. fluid temperature and/or pressure) to the master hubs 50, 56 that are at the proportioner 41. This data can then be used to control pumps 12, 14 and heating system 34 in the proportioner 41, or in the spray foam hoses 20, 22, 30, 31, 32 and/or 33, to provide optimum fluid conditions at or near the slave hubs 52, 54, 58, 60. The master hubs 50, 56 can also communicate operating and/or equipment parameters to the slave hub(s) 52, 54, 58, 60 that can be displayed to the spray foam applicator (e.g., the user of the spray gun 28). An example of this would be providing an optical and/or audible signal to the spray foam operator to indicate the status of the proportioning system 41, remaining fluid remaining in bulk storage tanks 16, 18 near the proportioner 41, or pressure and temperature readings at or near the gun 28. This approach can also allow the slave hubs 52, 54, 58, 60 to act as a wireless (e.g. BLE) communication access point to local devices near the respective slave hub. An example of this would be communication to a BLE enabled wearable status indicator worn by the spray foam applicator (e.g a FitBit like device to indicate amount of foam consumed, amount remaining, and machine status). The slave hubs 52, 54, 58, 60 can also be used to power and control indicator lights built into the hoses 20, 22, 30, 31, 32 and/or 33 and/or gun 28 itself.

Figure 2:
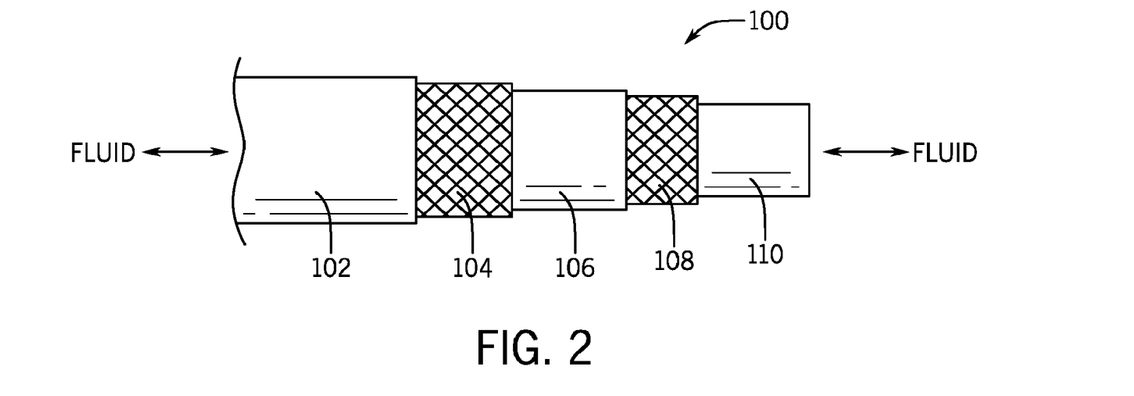
FIG. 2 is a side view of and embodiment of a smart hose that may be included in the spray application system of FIG. 1.

Turning now to FIG. 2, the figure is a side view of an embodiment of an electrically conductive "smart" hose 100. The hose 100 may be included in the hose 20, 22, 30, 31, 32 and/or 33. In the depicted embodiment, the hose 100 may include an outer insulation jacket 102, an outer metal braid (e.g., outer shield) 104, an outer dielectric (e.g., electric insulator) 106, an inner braid 108, and a hollow inner dielectric (e.g., electric insulator) 110. Fluid may flow through the hollow inner dielectric 110, completely traversing the electrically conductive hose 100. The conductive layers or layers 104, 108 lie within the hose 100 construction as braided layers or as a wound wire or foil layer within the hose 100 construction. If a reference layer is required (e.g. neutral, ground return) then the two layers 104 and 108 of conductive material are required. If two conductive hoses are used, one can be used for the reference power and/or signal. In this two conductive hose scenario, only one conductive element 104 or 108 is used per hose. The conductive layers may be made of metals, metal alloys, or a combination thereof. The dielectric layers may be made of plastics (e.g., polymeric materials, both natural polymers as well as artificial polymers), rubber, silicone, and so on, that have dielectric properties or that are low (or no) conductors of electricity.

Figure 3:
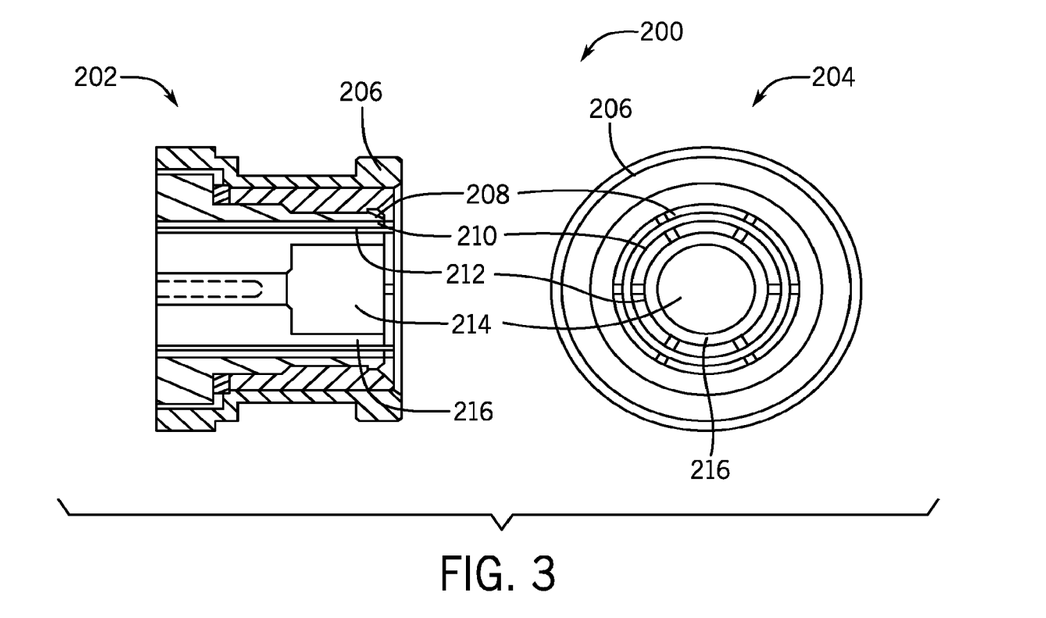
FIG. 3 is a side and front view of an embodiment of a smart hose fitting.

FIG. 3 illustrates an example of a smart hose fitting 200. More specifically, the figure illustrates a side sectional view 202 and a frontal view 204 of an embodiment of the hose fitting 200. In the depicted embodiment, the hose fitting 200 includes a coupling nut 206, which may be used to couple with other hose fittings. The hose fitting 200 also includes an outer contact 208, and outer insulator 210, an inner contact 212, a hollow conduit 214, and an inner insulator 216. The contacts 208, 212 are conductive and may be connected to the conductive elements 104, 108 of the smart hose 100 of FIG. 1. The insulators 210, 216 may provide for electrical insulation and may include dielectric properties.

Figure 4:
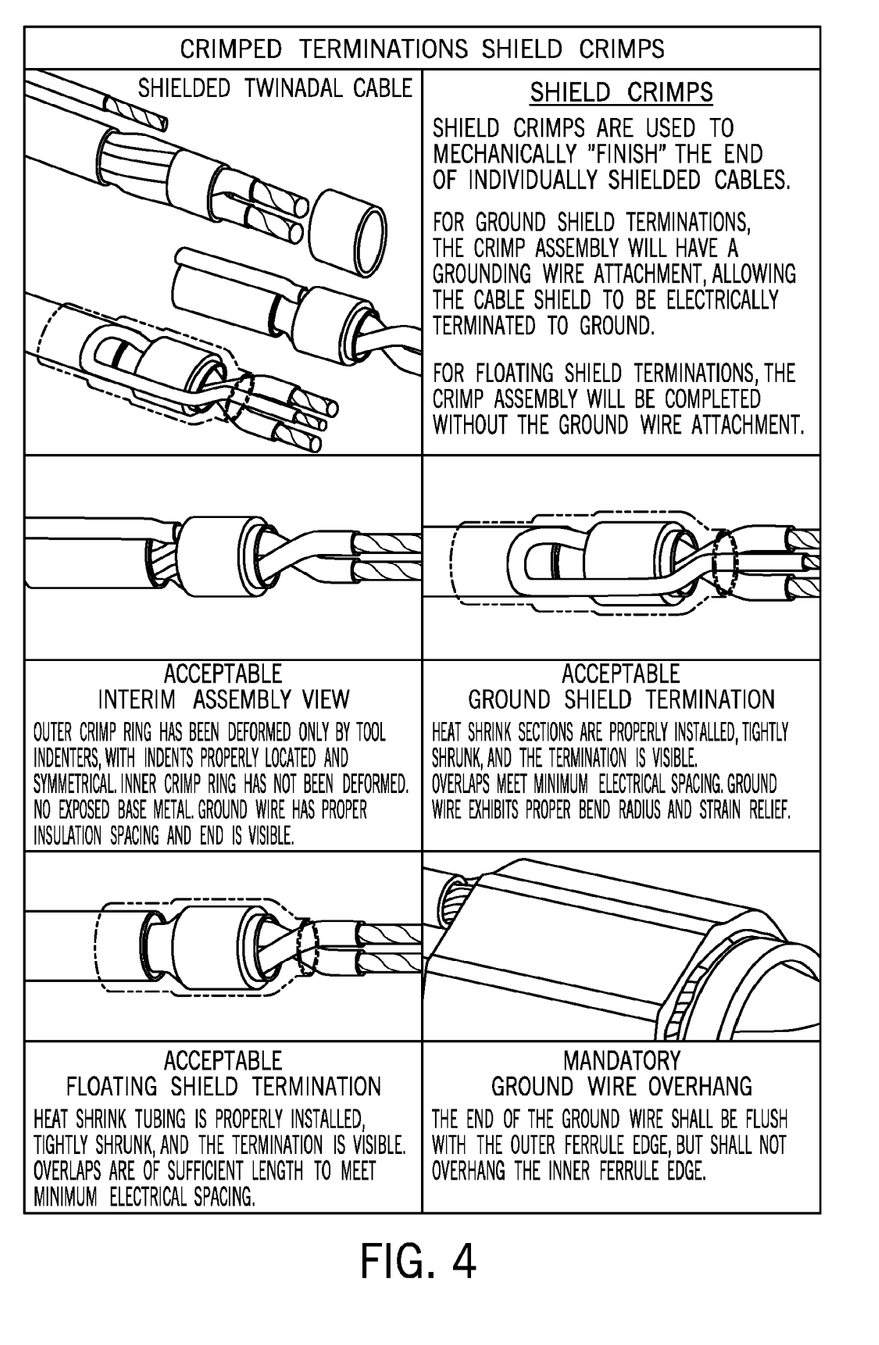
FIG. 4 illustrates embodiments of external wire crimping methods.

To connect the hose fitting 200 to the smart hose 100, crimping may be used. For example, insulating material may stripped away from the smart hose 100 to expose the conductive layer(s) 104, 108. A modified hose fitting (e.g., fitting 200) may be in direct contact with the conductive materials and held in place against mechanical loads. A typical approach may use crimped hydraulic fittings. The fitting 200 now serves as both a hydraulic connection at an electrical buss potential. The mating hose or mating element (e.g. manifold) may or may not have electrical properties. Nonelectrical property hoses (e.g., hoses that do not carry electricity) would serve as isolation elements so that serial groups of different buss voltages or signaling can be fashioned into a linear hose. This could also prevent undesirable shunting of busses. The manifold housing can also serve as an insulator. Examples of external wire crimping methods are shown in FIG. 4

Example Reduction to Practice

Figure 5:
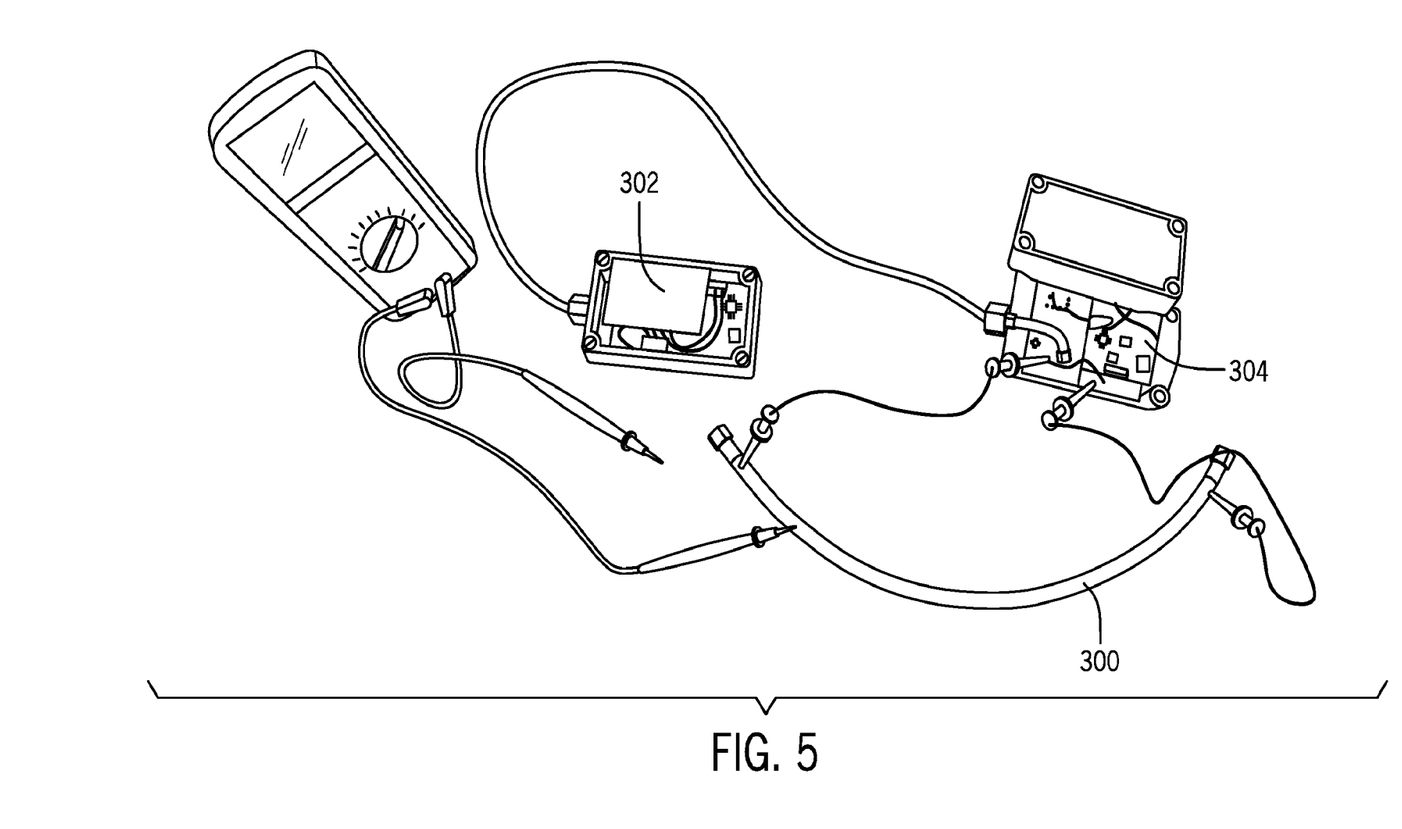
FIG. 5 is a picture an example smart hose reduced to practice.
Figure 6:
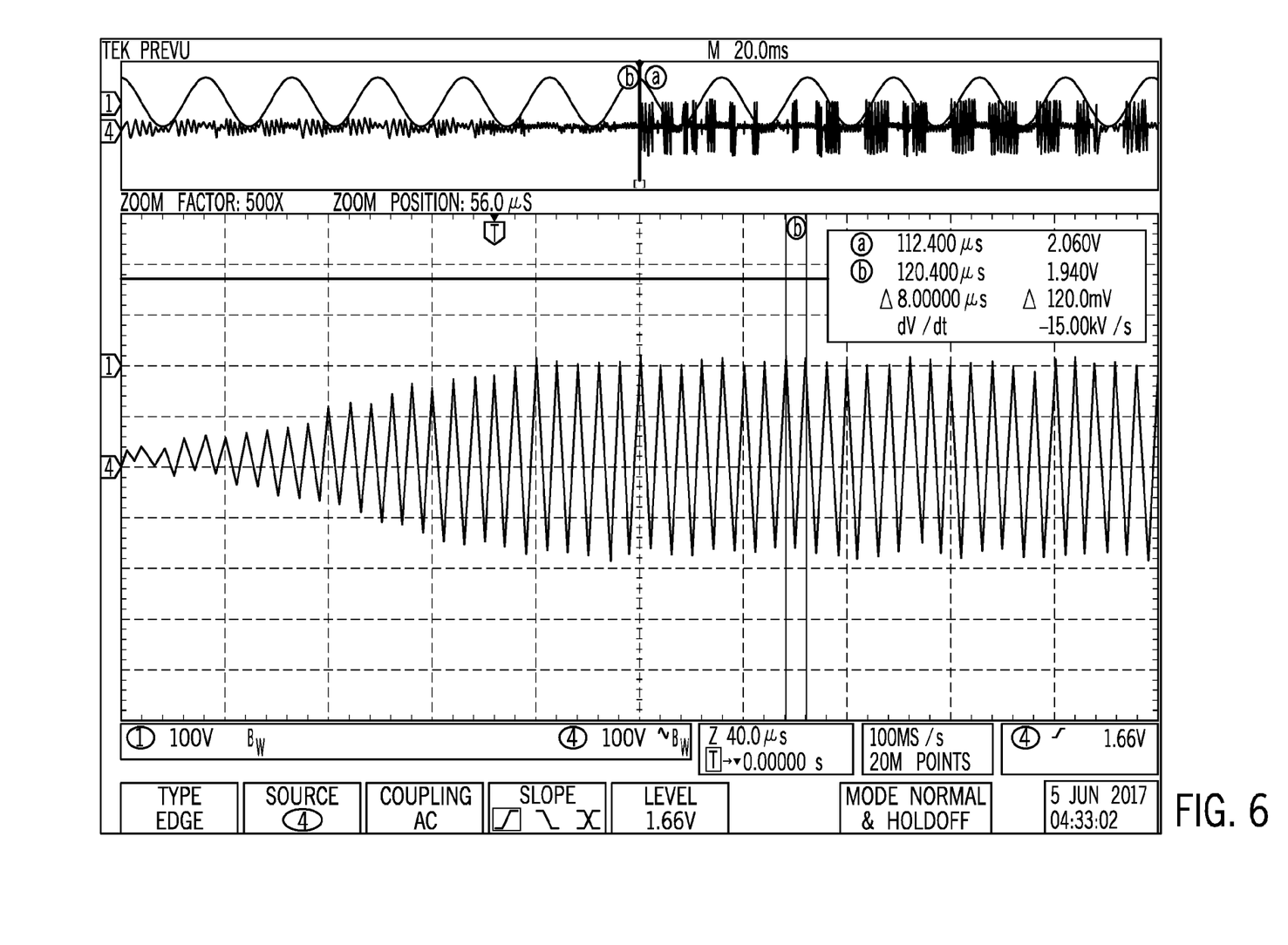
FIG. 6 is a screenshot of an embodiment of one or more oscilloscope traces of signals traversing the smart hose of FIG. 5.

FIGS. 5 and 6 illustrate a picture and a screenshot, respectively, of an example reduction to practice for the hose 100. The reduction to practice was created to demonstrate electrical power transfer and communications over stainless steel reinforcement braid of a common plumbing hose, creating a smart hose 300. An oscilloscope trace depicted in FIG. 6 show Power Line Communication (PLC) using amplitude shift keying. Frequency Modulation over power can also be used. Power line modems may be used to communicate over the hose 100, 300. Now turning back to FIG. 5, a master PLC modem 302 on left commanded changes to the LEDs associated with a slave PLC modem 304 on right. The PLC protocol is not critical. There are several PLC standards used in Smart Grid applications. The techniques described herein may use a PLC standard or a proprietary variant.

Figure 7:
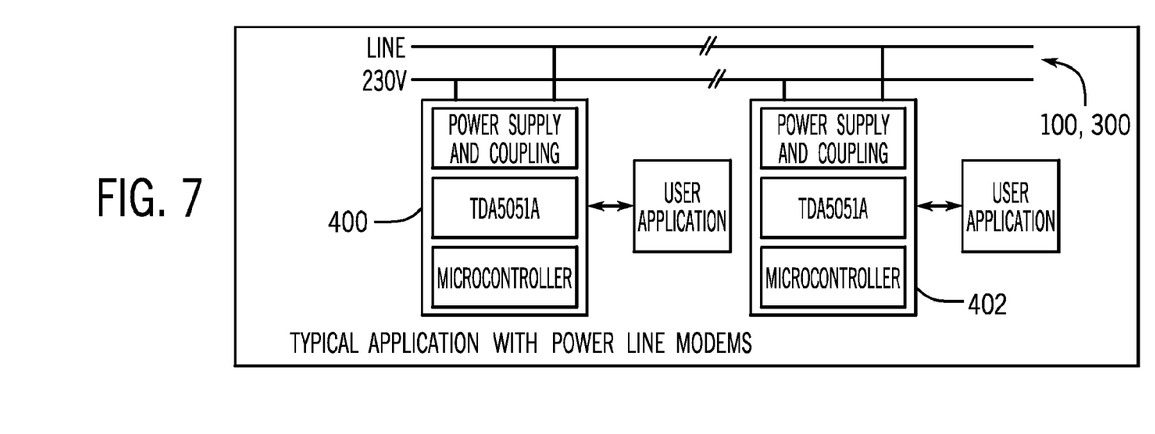
FIG. 7 is a block diagram illustrating an example application of power line modems through a smart hose.
Figure 8:
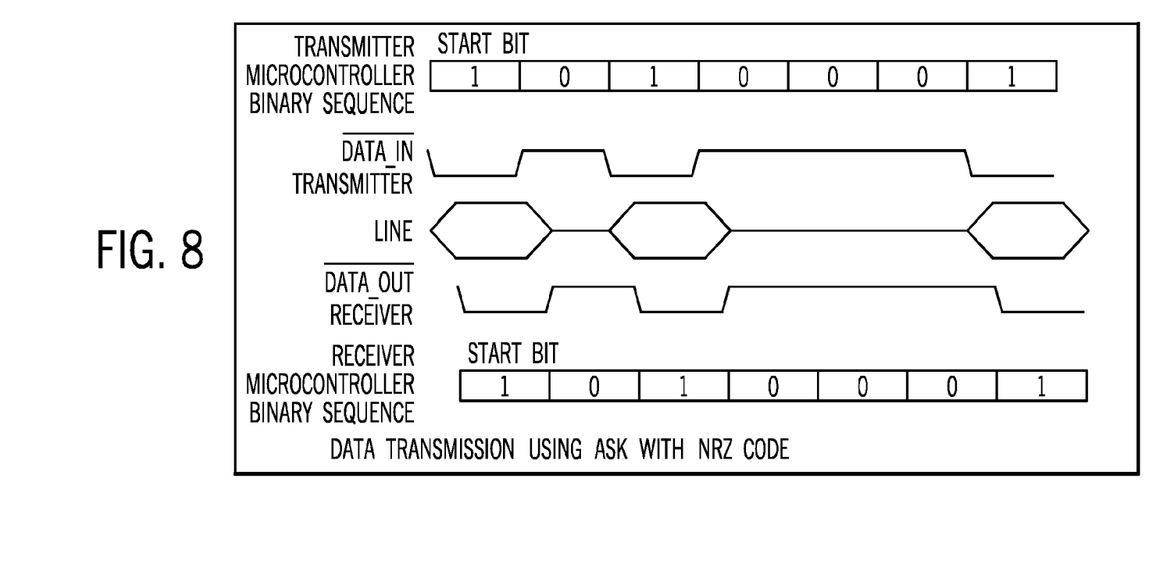
FIG. 8 depicts an example communications (e.g. PLC communications) of binary signals through a smart hose.

FIG. 7 is a block diagram illustrating an example application of power line modems 400, 402 over, for example, hose 100, 300. FIG. 8 depicts an example communications (e.g., PLC communications) of binary signals through the smart hose 100, 300 via, for example, modems 400, 402.

Figure 9:
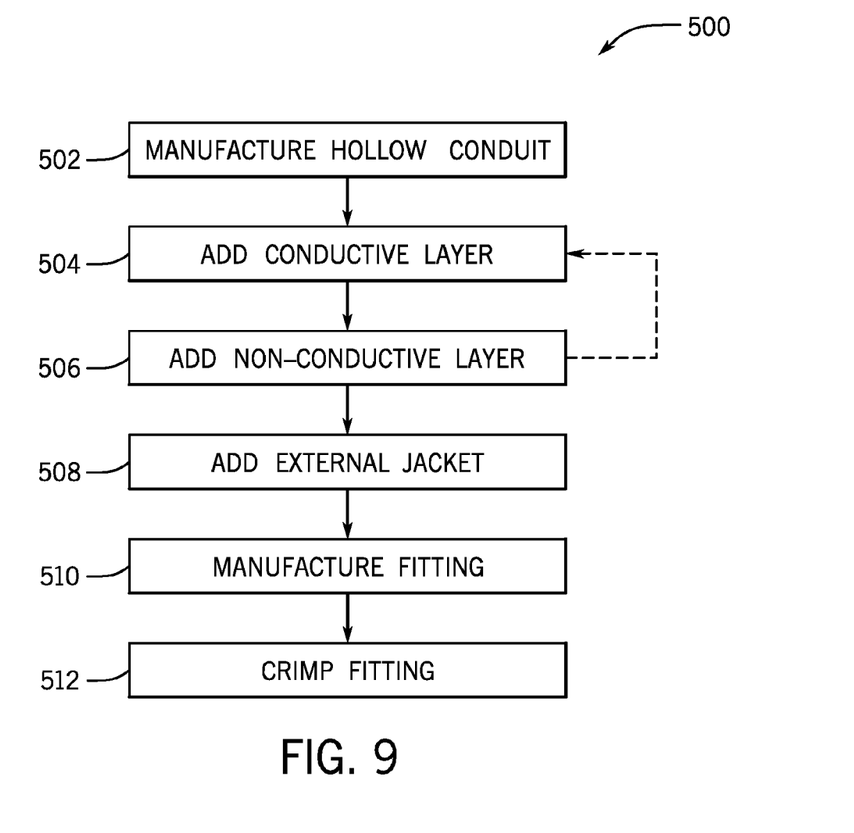
FIG. 9 is a flowchart of an embodiment of a process that may be used to manufacture a smart hose.

FIG. 9 is a flowchart of an embodiment of a process 500 that may be used to manufacture the smart hose 100. In the depicted embodiment, the process 500 may manufacture (block 502) a hollow conduit, such as the conduit 110. The hollow conduit may be used to deliver fluid, and may be made of insulative material. The process 500 may then add (block 504) a conductive layer on top of the hollow conduit, for example braided material, foil, wire, and so on, made of conductive material such as metal. The process 500 may then add (block 506) a non-conductive layer on top of the conductive layer. If more than one conductive layer is used, the process 500 may iterate through blocks 504 and 506 to build up any number of conductive layers, such as 2, 3, 4, 5, 6, 7, 8, or more layers. The process 500 may then add (block 508) an external protective jacket, such as the jacket 102.

If a fitting is desired, such as fitting 200, the process 500 may then first manufacture (block 510) the fitting 200 to include the desired contact and insulation layers.

The process 500 may then crimp (block 512) the fitting onto the manufactured hose Examples of external wire crimping methods are shown in FIG. 4. In this manner, the smart hose 100 may be manufactured, suitable for use in a variety of fluid distribution systems but additionally providing for electrical distribution throughout. The hose 100 may then be used to connect devices at or near the spray gun 28 with, for example, the proportioner system 40, to communicate data and/or electric power between the proportioner system 40 and locations at or near the spray gun 28.

Figure 10:
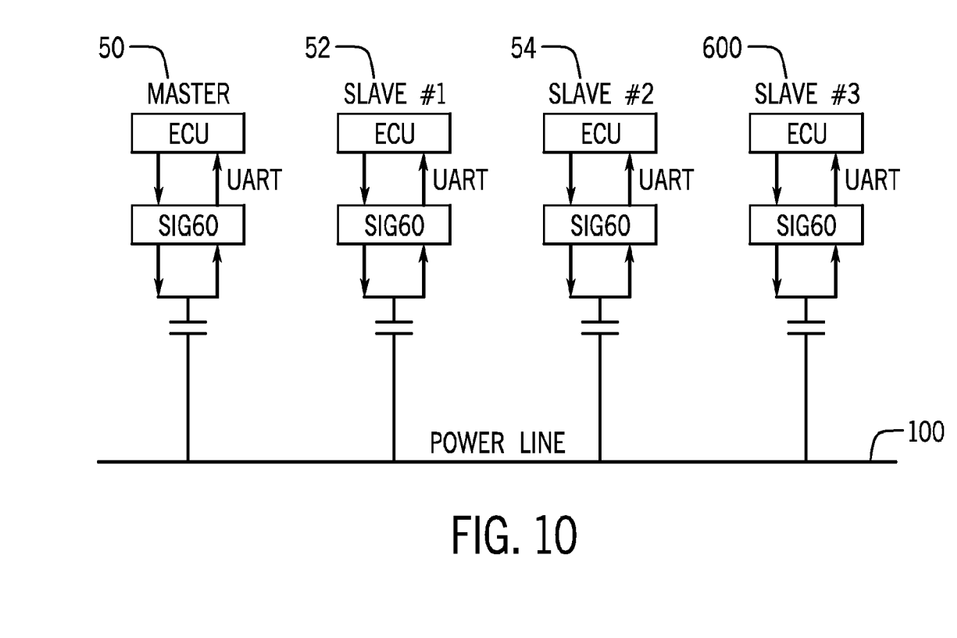
FIG. 10 is a block diagram of master and slave hubs disposed on a conduit.

Turning now to FIG. 10, the Figure illustrates an embodiment of one of the master hubs, e.g., master hub 50, communicatively coupled to various slave hubs, e.g., hubs 52, 54, 600, through smart hose 100. The slave hub(s) 52, 54, 600 contain electronic components that are powered by the conductive elements (e.g., 104, 110) within or between fluid/gas conduits, such as hose 100. The function of these slave hubs 52, 54, 600 is to transmit digital data signals over the same conductors that power the electronics in the hubs 52, 54, 600. This communication can be simplex, half duplex, duplex, or a combination thereof. This master/slave hub approach allows the power sending elements (e.g., conductors 104, 110) to also act as a communication channel, which eliminates the need for extra cables/conductors. This approach is referred to as "Power Line Communication" (PLC). The use of PLC in combination with conductive fluid or gas conduits 100 presents an extension of the technology, in that the conduit (or conduits) themselves become the electrically conductive member(s) required to implement PLC without additional power or signal cables.

The slave hub(s) 52, 54, 600 can have integrated or attached electronics to provide local sensing and communication capabilities in the vicinity of the slave hub(s) 52, 54, 600. This information can be processed by electronics within the hub 52, 54, 600, displayed to users in the vicinity of the hub 52, 54, 600, or communicated between the slave 52, 54, 600 and master hub 50 to control or communicate parameters of other systems.

Figure 11:
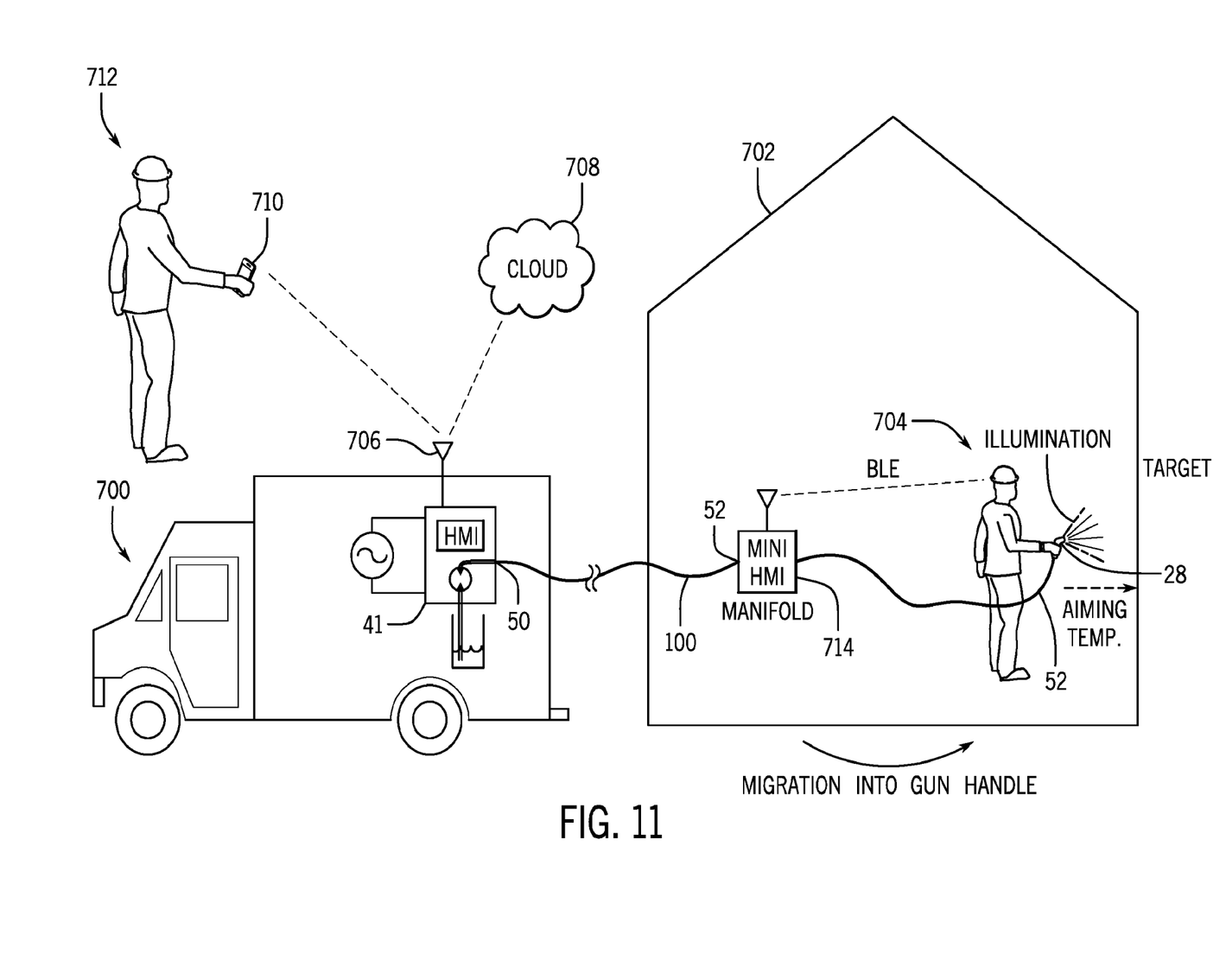
FIG. 11 is a block diagram of an SPF system including a spray gun operator communicatively coupled to systems/users in a vehicle and in a cloud.

FIG. 11 illustrates an example of a truck 700 having the proportioning system 41 and communicatively and fluidly coupled to the gun 28 via the hose 100. The gun 28 is shown as being operated in a house or building 702 by an operator 704. As mentioned earlier, the proportioning system 41 may include master hubs (e.g., master hub 50) and the hose may be coupled to one or more slave hubs (e.g., slave hubs 52, 54). The proportioning system 41 may include or be communicatively coupled to a communications system 706, such as a WiFi system, Ethernet system, Bluetooth system, wireless mesh system, or a combination thereof. The communications system 706 may communicatively couple the proportioning system 41 to a cloud 708, such as a software-as-a-service (SaaS), platform-as-a-service (PaaS), infrastructure-as-a-service (IaaS) and so on. The cloud may enable analysis of spray foam data during operations, download of software for various components of the system 10 (e.g., proportioning system 41), a repository for manuals, and so on.

A mobile device 710, such as a smartphone, tablet, notebook, and so on, may enable a user 712 (e.g., assistant, supervisor, trainer, observer) to communicate with the cloud 708 and the proportioning system 41, for example, via the communications system 706. The user 712 may be in the truck 700 or in a vicinity, but because of the cloud 708, the user 712 may be anywhere and use, for example, a browser to communicate with the proportioning system 41, for example, from a location geographically remove from the truck 70) and/or from the building 702.

Near the gun 28, a human-machine-interface (HMI) system 714 may provide for visual, audio, video, and similar data to the operator 704, and may receive inputs from the operator 704. The HMI system 714 may include a communications system that may enable WiFi, Ethernet. Bluetooth, and/or wireless mesh communications with systems inside of the building 702, including systems carried by the operator 704 (e.g., virtual reality glasses/systems, augmented reality glasses/systems, smartphones, tablets, walkie talkies, and so on). Accordingly, the operator 714 may receive data from the proportioning system 41, including temperatures, pressures, flow rates, levels in tanks 16, 18, and so on. The operator 714 may also receive data from the cloud 708 and from the user 712, and/or deliver data to the cloud 708 and to the user 712.

Added Features/Advantages

By using this approach, critical information can be communicated to strategic locations in the system to improve efficiency and quality of process.

This approach can use the hose itself as the power and communication link between the proportioning system and the work area of the spray foam applicator (e.g. at/near the spray gun).

This approach eliminates fragile sensor connections, sensor wires, splices, and power connections in the hose assembly.

The manifold becomes a smart information hub close to the spray gun.

Enabled by power line communication techniques.

The "smart hub" (e.g slave model near the gun) can be used to drive optical fibers to relay information (temporal or color encoded) to spray gun operators line of sight.

Multiple temperature and pressure and other sensors are now enabled at the spray gun (distal) end without adding wires. Signaling is temporally multiplexed via PLC methods.

Chemical A and chemical B temperature and pressure are measured at Spray gun to improve mix ratio and quality of foam.

Quantization of sensory data is provided by a local microprocessor with sensor proximal to fluid path. This improves signal to noise improvement of sensory data especially when used as feedback for pressure or heating servo control system.

Ambient conditions (temperature, humidity) can be measured at manifold region and communicated via PLC to main panel controller to make real-time adaptive process variable changes to ensure spray quality.

Manifold becomes wireless hub for short haul communication with mobile devices that augment the spray foam application system.

Examples are target moisture sensor, mobile phones for cloud to gun communication, target surface temperature sensor.

Optionally the manifold can be located closer to the spray gun.

Optionally, the smart hub (slave hub) can be included in the spray gun itself.

Optionally the whip hose can be heated with control from the manifold microprocessor.

Communication between main panel can be simplex, half duplex, or duplex. Enabling commands to be initiated by the manifold by internal processes or from the spray gun operator and sent to main panel.

Examples are process control manual override, pressure off, air blast nozzle cleaning, shutdown, emergency shutdown.

The manifold may contain a simple HMI with display and buttons

Several watts of power can be transferred over smart hose to operate peripherals at manifold end of hose or through a conductive whip into the spray gun. Examples of gun based powered elements are electromechanical injector valves for precisely controlling A/B mix ratios, target illumination light source, aiming laser.

Figure 12:
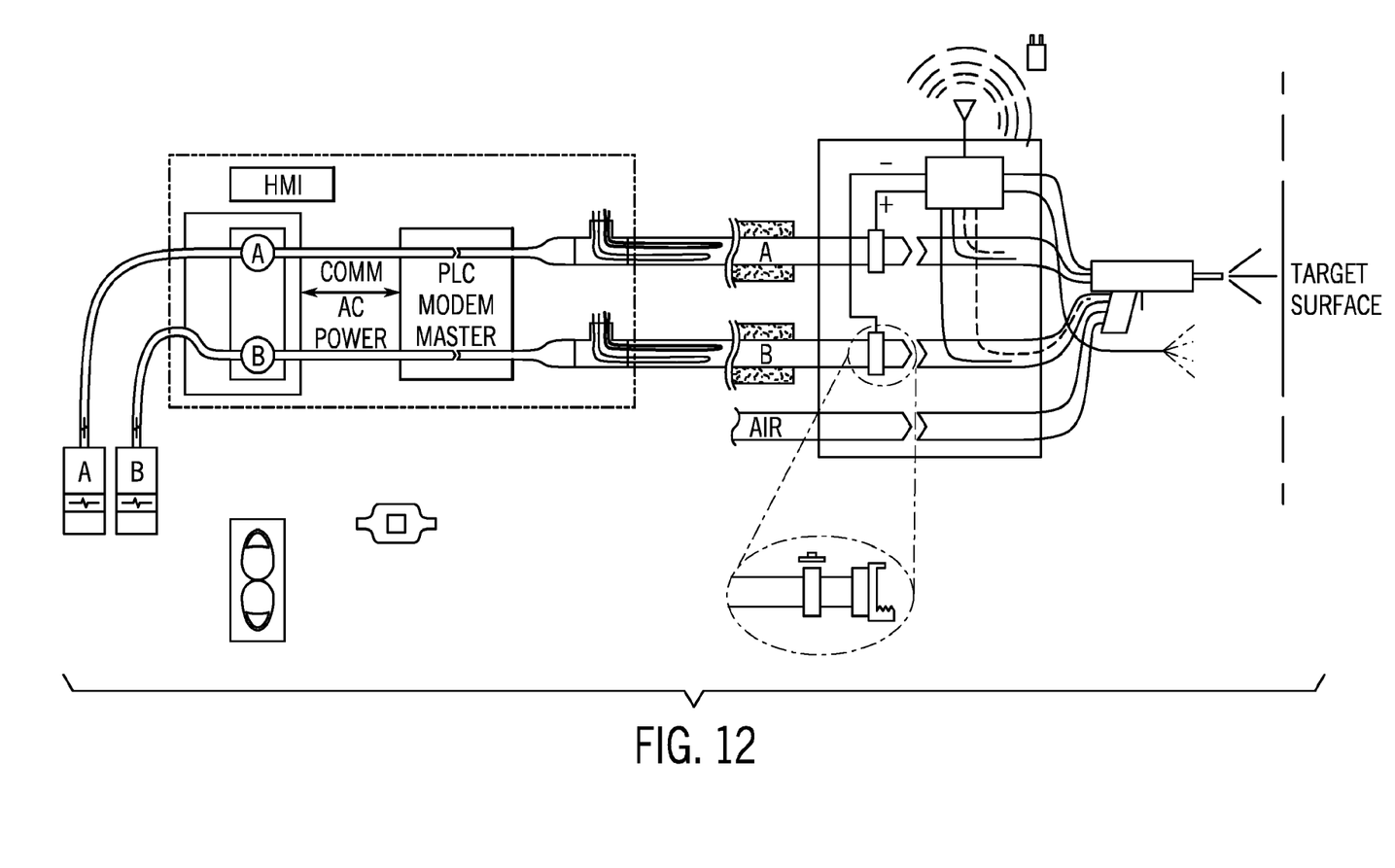
FIG. 12 illustrates and describes various features that may include manifolds, (e.g., fluid manifolds) that may include or communicate with human-machine-interface HMI systems while also providing for distribution of fluid.

FIG. 12 illustrates and describes various features that may include manifolds, (e.g., fluid manifolds) that may include or communicate with HMI systems, such as the HMI system 714 described in FIG. 11. For example, the figure illustrates the provisioning system 41 which may include PLC communications in the depicted embodiment, a master (e.g., master modem) may use one or both conduits of the fluids A, B to provide for PLC techniques. Also shown is a wireless communications device that may be powered via the PLC techniques described herein to communicate with external devices, such as devices proximal to or in the spray gun, or being carried by the spray gun user. Also shown are the smart fittings (e.g., shown in detail view) that may carry PLC communications and/or electrical power and other electrical signals. As mentioned earlier, the smart fittings may couple (fluid couple and/or electrically couple) one or more smart hoses.

Figure 13:
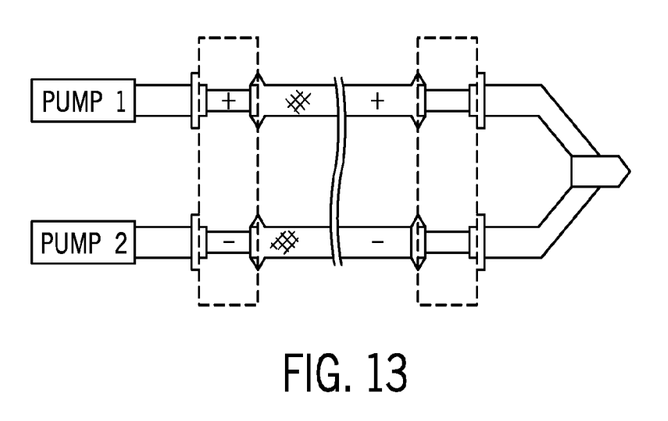
FIG. 13 illustrates and describes various features that may include manifolds, (e.g., fluid manifold is depicted) that may include or communicate with HMI systems via low voltage techniques.

FIG. 13 illustrates and describes various features that may include manifolds, (e.g., fluid manifold is depicted) that may include or communicate with HMI systems, such as the HMI system 714 described in FIG. 11. The manifold system depicted may include low voltage techniques, as well as using heat found in hoses (e.g., hoses 20, 22, 30, 31, 32 and/or 33) to convert the heat to electrical power suitable for powering the various master hubs and slave hubs described herein, and to use in communications through the hoses 20, 22, 30, 31, 32 and/or 33.

Figure 14:
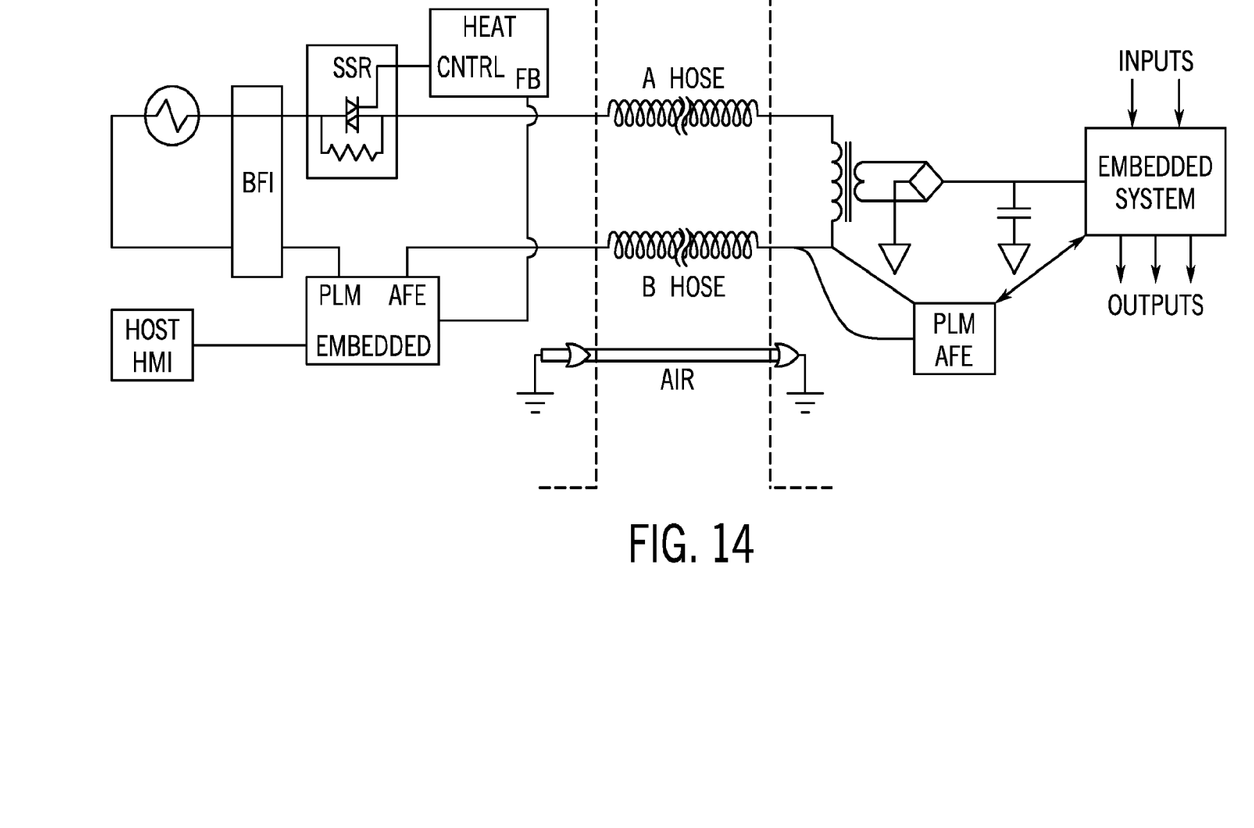
FIG. 14 illustrates and describes energy harvesting techniques to provide electrical power to manifold systems, such as fluid manifold systems.

FIG. 14 illustrates and describes further details of energy harvesting techniques to power manifold systems, including distal hose end manifold systems. For example. A and be hose heat recovery systems may convert heat to electricity (e.g., via a thermoelectric generator that may convert heat via the Seebeck effect into electricity). Electric power produced may then covered (e.g., via power converters, such as transformers, to a desired voltage, current, and/or inductance, to power certain devices. The devices may include embedded systems, wireless systems, sensor systems, communication systems, and so on. Data may be transmitted via the smart cables, as well as power, and used to provide information from/to the proportioner system 41. Accordingly the operator may be informed of certain conditions, such as temperature, flows, pressures, and so on, at or near the proportioner system 41, at or near the smart hoses, and at or near the spray gun.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A fluid delivery system, comprising:
   an augmented reality or virtual reality device configured to be carried by an operator and configured to interface with a proportioner system;
   a master hub disposed on a fluid delivery device; and
   at least one slave hub disposed on a hose and communicatively coupled to the master hub, wherein the hose comprises:
   a fluid conduit configured to deliver a fluid; and
   a first electrically conductive element configured to deliver electricity through a length of the hose.

2. The system of claim 1, comprising a second slave hub disposed on a second location on the hose and communicatively coupled to the master hub, or a second hose comprising a second fluid conduit configured to deliver a second fluid and a second electrically conductive element configured to deliver electricity through a second length of the second hose.

3. The system of claim 1, wherein the slave hub is configured to communicate data to a second system.

4. The system of claim 3, wherein the second system comprises a sensor system, an information display system, a data input system, or a combination thereof.

5. The system of claim 1, comprising an energy recovery system coupled to the hose and configured to recover energy from the hose.

6. The system of claim 5, wherein the energy comprises a thermal energy and wherein the energy recovery system is configured to transform the thermal energy into electricity.

7. The system of claim 1, wherein the hose is configured to provide for power line communications (PLC) via the first electrically conductive element.

8. The system of claim 7, wherein the PLC comprises amplitude shift keying, frequency modulation, or a combination thereof.

9. The system of claim 1, wherein the fluid delivery device comprises the proportioner system configured to deliver one or more fluids, and wherein the fluid is included in the one or more fluids.

10. The system of claim 1, wherein the fluid delivery device or the hose comprises a second master hub communicatively coupled to the at least one slave hub, to a second slave hub, or to a combination thereof.

11. The system of claim 7, comprising a smart fitting coupled to the hose via the first electrically conductive element and configured to provide for the PLC via the first electrically conductive element.

12. The system of claim 1, wherein the hose comprises a second electrically conductive element configured to deliver electricity through the length of the hose.

* * * * *